United States Patent [19]

Laity

[11] Patent Number: 4,581,072

[45] Date of Patent: Apr. 8, 1986

[54] POLYMER SOLUTIONS

[75] Inventor: Peter R. Laity, Keresley, England

[73] Assignee: Courtaulds PLC, London, England

[21] Appl. No.: 579,886

[22] PCT Filed: Jun. 7, 1983

[86] PCT No.: PCT/GB83/00151

§ 371 Date: Feb. 8, 1984

§ 102(e) Date: Feb. 8, 1984

[87] PCT Pub. No.: WO83/04415

PCT Pub. Date: Dec. 22, 1983

[30] Foreign Application Priority Data

Jun. 8, 1982 [GB] United Kingdom ............... 8216566

[51] Int. Cl.$^4$ .................... C08K 3/20; C08K 3/32; C08L 1/02
[52] U.S. Cl. .................... 106/176; 106/177; 106/186; 106/311
[58] Field of Search ............... 106/177, 186, 311, 176

[56] References Cited

U.S. PATENT DOCUMENTS

| | | |
|---|---|---|
| 3,332,999 | 7/1968 | Mitchell et al. |
| 3,447,939 | 6/1969 | Johnson ............................. 106/311 |
| 3,489,687 | 1/1970 | Inamorato et al. |
| 3,810,769 | 5/1974 | Blacker et al. ..................... 106/177 |
| 4,075,163 | 2/1978 | Hofer et al. ......................... 106/177 |
| 4,076,690 | 2/1978 | Rosenberger ....................... 106/177 |
| 4,144,080 | 3/1979 | McCorsley, III .................. 106/186 |
| 4,290,815 | 9/1981 | Henry . |
| 4,338,216 | 7/1982 | Earl et al. . |

FOREIGN PATENT DOCUMENTS

| | | |
|---|---|---|
| 158656 | 4/1981 | Fed. Rep. of Germany . |
| 0047929 | 9/1981 | Fed. Rep. of Germany . |

*Primary Examiner*—Allan M. Lieberman
*Attorney, Agent, or Firm*—Howson and Howson

[57] ABSTRACT

Shaped articles, such as fibres and films, are obtained from a polymer solution comprising cellulose, a solvent for the cellulose comprising a cyclic tertiary amine N-oxide and water, and a stabilizer for the solution selected from the group consisting of sodium hexametaphosphate, disodium hydrogen phosphate, potassium dihydrogen phosphate, hydroxy-ethylidene diphosphonic acid, aminoethyl diphosphonic acid, and complexes of such compounds with occluded metal ions present in the polymer solution. The stabilizer is present in an amount sufficient to stabilize the solution against thermal degradation which causes loss of solvent and discoloration of solvent and dissolved cellulose.

9 Claims, No Drawings

POLYMER SOLUTIONS

This invention relates to the stabilisation of hydrated tertiary amine N-oxides suitable as solvents for organic polymers and of solutions of organic polymers, particularly cellulose, in such solvents. The polymer solutions may be used as spinning or casting dopes for making shaped polymer articles such as fibres or films, and the invention includes a process for making such articles.

Hydrated tertiary amine N-oxides (hereinafter referred to on occasion as 'amine oxides' for convenience) are susceptible to degradation, particularly at elevated temperatures and at certain lower levels of hydration, both of which are conditions which favour the dissolution of organic polymers in the amine oxides. Degradation results in a loss of amine oxide, which is an expensive solvent, and can give rise to discolouration of the solvent and any polymer dissolved in it.

Degradation of the amine oxide solvent may also be accompanied by degradation of an organic polymer dissolved in that solvent. In the case of cellulose, there can be a significant reduction in the degree of polymerisation during dissolution at elevated temperatures and during any subsequent interval before the cellulose is regenerated.

According to this invention, a solvent for organic polymers comprises a hydrated tertiary amine N-oxide characterised by the incorporation therein as a stabilising additive of one or more compounds selected from phosphoric acids, phosphate salts, phosphonic acids, phosphonate salts, and complexes of any of the foregoing with occluded metal ions. the invention having an organic polymer dissolved therein. The preferred organic polymer is cellulose.

The added salt or acid stabilises the amine oxide and any dissolved organic polymer by substantially reducing the rate of degradation reactions. It is believed that these are mainly oxidation reactions catalysed by occluded metal ions in the system, usually iron, and that the added acid or salt complexes with these ions to effectively remove the catalyst.

The level of additive required to give the desired stability depends upon a number of factors including the occluded metal ion concentration, the time taken to form an organic polymer solution in the amine oxide and to regenerate the organic polymer from that solution, and the temperature to which the solution is heated as the organic polymer is being dissolved. Reduced processing times reduce the extent of degradation, and reduced temperatures and occluded metal ion concentrations reduce the rate of degradation.

In general, up to 3.0 percent by weight of stabilising additive is sufficient, with a preferred range being 0.1 to 1.0 percent by weight. In the case of solutions of cellulose, we have found that with commercial grades of wood pulp and amine oxides, and local mains water, a concentration of stabilising additive of 1 percent by weight of less can give satisfactory stabilisation under conditions chosen to represent those encountered in dope preparation for a fibre spinning process.

Phosphoric and phosphonic acids and their salts have the advantage compared with other potential complexing agents for occluded metal ions that they do not in general form coloured complexes, particularly with iron, so that polymeric fibres or films, regenerated from solution are not stained. Suitable acids and salts include disodium hydrogen phosphate, potassium dihydrogen phosphate, sodium hexametaphosphate, hydroxyethylidene diphosphonic acid, and aminoethyl disphosphonic acid. Sodium hexametaphosphate is the preferred stabilising additive.

Hydrated tertiary amine N-oxides which are suitable solvents for cellulose and other organic polymers are described in U.S. Pat. No. 2,179,181 and British Pat. No. 1,144,048, which are incorporated herein by reference, and such amine oxides can be used in the present invention. The latter patent describes cyclic tertiary amine N-oxides and these are the preferred solvents used in the present invention, particularly N-methyl morpholine N-oxide which combines effectiveness as a solvent with thermal stability.

According to the invention there is provided a process for making a shaped article of an organic polymer comprising dissolving the organic polymer in a solvent comprising a hydrated tertiary amine N-oxide to form a solution of the polymer, shaping the polymer solution and coagulating the shaped solution to form the desired shaped polymer article, characterised by incorporating in the solvent prior to the shaping step a stabilising additive which comprises one or more of the compounds comprising phosphoric acids, phosphate salts, phosphonic acids, phosphonate salts, and complexes of any of the foregoing with occluded metal ions. Preferably, the polymer solution is shaped into the form of fibres or film.

For fibre spinning it is usually desirable to obtain as high a polymer concentration in the spinning dope as is compatible with suitable spinning viscosities. By this criterion, tertiary amine N-oxides are most effective as solvents for organic polymers when they are in their normal hydrated state. The optimum water content of the solvent varies according to the particular amine oxide used, and the particular polymer which it is desired to dissolve. For cellulose a suitable general range is 1 to 30 percent by weight of water, with a range of about 5 to 20 percent water being preferred for N-methyl morpholine N-oxide.

Polymers for which amine oxides are suitable solvents are set out in the aforementioned British Pat. No. 1,144,048, and in addition to cellulose include synthetic polymers such as polyamides and cellulose acetate and natural polymers such as hair, feathers and casein. In the case of cellulose, a preferred source is wood pulp, with the dissolving grades provided for the viscose process being suitable.

The polymer material has to be mixed with the amine oxide solvent to obtain dissolution, and it is advantageous for that solvent to have a water content in excess of that required to give the specified water content of the polymer solution. This excess water promotes even polymer/solvent distribution and, in the case of wood pulp, promotes swelling of the cellulose fibres as an aid to dissolution. Even distribution is important because high local concentrations of polymer can give rise to undesirable gel formation. Once a uniform dissolving process is under way, then the water content of the solvent may be reduced to the level specified as optimum. For example in a continuous barrel mixer operated under vacuum to reduce the temperature requirement for a desired dissolution rate, the temperature along the barrel may be profiled so that the excess water has evaporated off by the time solution is completed close to the barrel outlet. A suitable initial water content of the solvent for even mixing with wood pulp is in the range 15 to 50 percent by weight.

For cellulose, a polymer concentration of at least 5 percent by weight of the solution is preferred for a fibre spinning dope, with 5 to 35 percent by weight being a reasonable working range.

Reference has been made to the use of the hydrated amine oxide solvent in combination with excess water to promote even mixing. It is also possible to add other diluents to the solvent, and these may themselves be solvents for a particular polymer or at least act as a co-solvent with the hydrated amine oxide. For example dimethyl acetamide is a suitable co-solvent for cellulose with an amine oxide.

The invention is illustrated by the following Examples in which percentages are given by weight on the basis specified.

In the Examples, the effect of the stabilising additive is shown in comparison with a control having no additive, and in the case of Examples 1 to 4 in comparison with an alternative additive. The effect is determined according to three parameters measured at the end of the test: the percentage of amine oxide remaining; the degree of polymerisation (D.P.) of the cellulose; and the colour of the solution. The three tests were carried out as follows:

AMINE OXIDE YIELD (%)

An aliquot of the solution, containing about 0.5 gm amine oxide, was acidified with hydrochloric acid and then reduced with an excess of titanous chloride solution. The excess titanous chloride used was determined by a back titration with ferric ammonium sulphate solution using sodium thiocyanate as an indicator (brick red colour). A blank titration made the excess titanous chloride a known quantity, and the weight of amine oxide in the sample, and hence the percentage yield, was calculated from the formula:

$$\text{Wt of amine oxide} = \frac{(B - T)}{1000} \times \frac{F}{2} \times A$$

where
B = Blank titre
T = Titre of sample
F = Molarity of ferric ammonium sulphate
A = Molecular weight of amine oxide

CELLULOSE D.P.

Water was added to the solution to precipitate cellulose as a lump. This was sliced into thin shavings, washed with water to remove residual amine oxide, and then conditioned to 12 percent water content.

The cellulose was dissolved in cuprammonium hydroxide solution at a concentration of 0.50 percent, and the viscosity of this solution was measured at 20° C. using a Shirley Capillary Rheometer. The related D.P. for that measured viscosity was then taken from a standard graph plotting D.P. against viscosity for such cellulose solutions. The D.P. of the cellulose fibres used for the test was determined beforehand using the same method.

COLOUR

The coloured material in the solution was extracted into a known quantity of water, and then the optical density of this extract was measured using a Spekker Colourimeter with a blue filter and a 4.0 cm path length. The optical density (OD) measured was then converted into the appropriate value for a volumetric dilution of the amine oxide by a factor of 100, and expressed as OD/100.

EXAMPLES 1 TO 4

Woop pulp (Saiccor double red band of D.P. 570), amine oxide (N-methyl morpholine N-oxide supplied by Texaco Inc.), water and any stabilising additive, were mixed to form a wet pulp mixture containing 0.7 percent stabilising additive (Example 1), 11 percent cellulose, 55 percent amine oxide and 33.3 percent water. For other additive levels (Examples 2, 3 and 4), the concentrations varied in proportion. This mixture was heated under vacuum (14 cm Hg absolute) up to a temperature of 100° C. in a glass vessel and held at that temperature for 4 hours. By the end of that period, the cellulose had gone into solution and water had evaporated off to give a final proportion of 15 percent cellulose, 75 percent amine oxide, 9 percent water and 1 percent stabilising additive (Example 1). Again, there was proportionate variation for Examples 2, 3 and 4, and for the control and comparative tests.

The solutions obtained were examined for cellulose D.P., amine oxide yield and colour as described.

In these Examples the stabilising additive used was disodium hydrogen phosphate in the concentrations specified, with comparative tests being carried out on a potential stabilising additive outside the scope of the invention, namely oxalic acid, again in the range of concentrations specified.

The results are shown in the following Table A.

TABLE A

| Stabilising Additive % in final solution | | % Yield of Amine Oxide | Cellulose D.P. | Colour (OD/100) |
|---|---|---|---|---|
| Control | 0.0 | 99.0 | 290 | 0.015 |
| Ex. 1 Na$_2$ H PO$_4$ | 1.0 | 99.9 | 453 | 0.010 |
| Ex. 2 Na$_2$ H PO$_4$ | 2.0 | 100.0 | 453 | 0.009 |
| Ex. 3 Na$_2$ H PO$_4$ | 5.0 | 100.0 | 446 | 0.003 |
| Ex. 4 Na$_2$ H PO$_4$ | 10.0 | 100.0 | 422 | 0.007 |
| Oxalic Acid | 0.5 | 94.7 | 526 | 0.074 |
| Oxalic Acid | 1.0 | 93.9 | 534 | 0.094 |
| Oxalic Acid | 2.0 | 94.5 | 496 | 0.034 |
| Oxalic Acid | 5.0 | 93.5 | 533 | 0.019 |
| Oxalic Acid | 10.0 | 94.5 | 498 | 0.019 |

The results show that the disodium hydrogen phosphate is effective at all four concentrations against loss of amine oxide and substantially reduces loss of cellulose D.P. This is in contrast with the oxalic acid which, whilst preserving cellulose D.P. rather better, apparently accelerates amine oxide loss and generates substantial discolouration.

EXAMPLES 7 TO 13

The procedure of Examples 1 to 4 was repeated for the concentrations of phosphoric acid, sodium hexmetaphosphate (S.H.M.P.) and hydroxy ethylidene disphosphonic acid (H.E.D.P.) specified in the following Table B:

TABLE B

| Stabilising Additive % in final solution | | % Yield of Amine Oxide | Cellulose D.P. | Colour (OD/100) |
|---|---|---|---|---|
| Control | 0.0 | 99.0 | 290 | 0.015 |
| Ex. 1 Na$_2$ H PO$_4$ | 1.0 | 99.9 | 453 | 0.010 |
| Ex. 7 H$_3$PO$_4$ | 1.0 | 100.0 | 460 | 0.008 |
| Ex. 8 S.H.M.P. | 1.0 | 100.0 | 457 | 0.005 |
| Ex. 9 S.H.M.P. | 0.5 | 99.6 | 470 | 0.008 |
| Ex. 10 S.H.M.P. | 0.3 | 99.4 | 425 | 0.010 |
| Ex. 11 S.H.M.P. | 0.1 | 99.2 | 340 | 0.013 |
| Ex. 12 H.E.D.P. | 0.3 | 100.0 | 459 | 0.005 |

TABLE B-continued

| Stabilising Additive % in final solution | % Yield of Amine Oxide | Cellulose D.P. | Colour (OD/100) |
|---|---|---|---|
| Ex. 13 H.E.D.P. | 0.1 | 99.6 | 438 | 0.009 |

EXAMPLES 14 TO 24

Solutions of cellulose in amine oxide and water were formed using the same proportions of those materials as specified in Examples 1 to 4 with varying levels of stabilising additives. However, in this case the mixing and solution process was carried out in a stainless steel pfleiderer mixer to more nearly simulate production conditions. The pfleiderer mixer was jacketed, and mixing was carried out at a jacket temperature of 80° C. for 30 minutes and then at 100° C. for a further two hours until solutions had formed. The mixer was under a vacuum of 7 cm Hg (absolute) throughout. These solutions were then analysed for cellulose D.P. as in previous Examples, and the results are shown in the following Table C. Amine oxide yield was not measured because of the difficulty of removing all of the sample solution from the pfleiderer mixer.

TABLE C

| Stabilising Additive % in final solution | Cellulose D.P. | Colour (OD/100) |
|---|---|---|
| Control | 0.0 | 234 | 0.071 |
| Ex. 14 KH$_2$PO$_4$ | 0.5 | 417 | 0.013 |
| Ex. 15 KH$_2$PO$_4$ | 0.3 | 424 | 0.017 |
| Ex. 16 KH$_2$PO$_4$ | 0.2 | 424 | — |
| Ex. 17 KH$_2$PO$_4$ | 0.1 | 410 | — |
| Ex. 18 S.H.M.P. | 0.5 | 396 | 0.016 |
| Ex. 19 S.H.M.P. | 0.3 | 345 | 0.020 |
| Ex. 20 S.H.M.P. | 0.2 | 495 | — |
| Ex. 21 S.H.M.P. | 0.1 | 462 | — |
| Ex. 22 H.E.D.P. | 0.3 | 522 | 0.009 |
| Ex. 23 H.E.D.P. | 0.1 | 504 | 0.010 |
| Ex. 24 H.E.D.P. | 0.05 | 495 | — |

EXAMPLES 25 TO 30

Solutions of cellulose in amine oxide and water were formed as described in Examples 14 to 24. At the 1 percent stabilising additive level, the other concentrations were cellulose 15 percent, amine oxide 75 percent, and water 9 percent, with proportional variation for different additive levels.

These solutions were analysed as in previous Examples, and were then transferred to separate glass vessels in which they were heated to various temperatures under a vacuum of 14 cm Hg (abs.) for 4 hours. A repeat analysis was then carried out on the solutions, and the results of the various heat treatments are shown in the following Table D. The amine oxide loss is expressed as a percent loss per hour, and the cellulose loss is expressed in the same way, as well as on the basis of fall in D.P.. The colour rise in terms of OD/100 over the 4 hours is also shown.

TABLE D

| Stabilising Additive % final solution | Temp. °C. | % Amine Oxide Loss per Hour | % Cellulose Loss per Hour | D.P. Fall | Colour Rise (OD/100) |
|---|---|---|---|---|---|
| Control | 0.0 | 100 | 0.34 | 0.63 | 300 → 140 | 0.008 → 0.087 |
| | 0.0 | 110 | 0.85 | 1.05 | 300 → 100 | 0.008 → 0.16 |
| | 0.0 | 120 | 1.47 | 2.56 | — | 0.008 → very dark |
| Ex. 25 H$_3$PO$_4$ | 1.0 | 100 | 0.53 | 1.68 | 388 → 198 | 0.00 → 0.13 |
| Ex. 26 H$_3$PO$_4$ | 1.0 | 110 | 1.59 | 2.13 | 388 → 177 | 0.00 → 0.18 |
| Ex. 27 S.H.M.P. | 1.0 | 100 | no measurable loss | 0.44 | 482 → 449 | — |
| Ex. 28 S.H.M.P. | 1.0 | 110 | 0.04 | 0.59 | 482 → 338 | 0.00 → 0.05 |
| Ex. 29 S.H.M.P. | 1.0 | 120 | 0.21 | 0.68 | — | 0.00 → 0.16 |
| Ex. 30 S.H.M.P. | 0.3 | 110 | no measurable loss | — | 396 → 228 | — |

EXAMPLES 31 TO 43

Sample solutions of cellulose in amine oxide and water were made according to the procedure described in Examples 1 to 4, with varying amounts of iron (as FeCl$_3$) and sodium hexametaphosphate being added to the samples at the start of the mixing/solution process. Control samples with no addition of sodium hexametaphosphate were made at various iron levels. The solutions formed contained approximately 75 percent amine oxide, 15 percent cellulose with the remainder being water and iron and sodium hexametaphosphate as appropriate.

The solution samples were analysed for cellulose D.P., amine oxide yield and colour as described previously and the results are shown below in Table E. These show that degradation of both amine oxide and cellulose appears to increase with increasing iron content.

The original D.P. of the cellulose was 580.

TABLE E

| SHMP Concentration % final solution | Iron Concentration (ppm) | % Yield of Amine Oxide | Cellulose D.P. | Colour (OD/100) |
|---|---|---|---|---|
| Control | 0.0 | 5 | 99.2 | 273 | 0.014 |
| Ex. 31 | 0.1 | 5 | 99.3 | 336 | 0.014 |
| Ex. 32 | 0.3 | 5 | 99.4 | 377 | 0.011 |
| Ex. 33 | 0.5 | 5 | 99.6 | 460 | 0.008 |
| Ex. 34 | 0.7 | 5 | 99.5 | 461 | 0.008 |
| Control | 0.0 | 10 | 97.5 | 250 | 0.026 |
| Ex. 35 | 0.1 | 10 | 97.6 | 338 | 0.024 |
| Ex. 36 | 0.3 | 10 | 98.2 | 350 | 0.012 |
| Ex. 37 | 0.5 | 10 | 99.2 | 427 | 0.007 |
| Control | 0.0 | 15 | 97.6 | 198 | 0.035 |
| Ex. 38 | 0.1 | 15 | 98.0 | 256 | 0.024 |
| Ex. 39 | 0.3 | 15 | 99.0 | 322 | 0.017 |

TABLE E-continued

| SHMP Concentration % final solution | Iron Concentration (ppm) | % Yield of Amine Oxide | Cellulose D.P. | Colour (OD/100) |
| --- | --- | --- | --- | --- |
| Ex. 40 | 0.5 | 15 | 98.9 | 360 | 0.012 |
| Control | 0.0 | 22 | 96.4 | 256 | 0.021 |
| Ex. 41 | 0.7 | 22 | 98.5 | 410 | 0.007 |
| Ex. 42 | 0.3 | 58.4 | 95.1 | 219 | 0.035 |
| Ex. 43 | 0.7 | 58.4 | 94.1 | 292 | 0.014 |

I claim:

1. A polymer solution comprising cellulose, a solvent for said cellulose comprising a cyclic tertiary amine N-oxide and water, and a stabiliser for said solution selected from the group consisting of sodium hexametaphosphate, disodium hydrogen phosphate, potassium dihydrogen phosphate, hydroxyethylidene diphosphonic acid, aminoethyl diphosphonic acid, and complexes of any of such compounds with occluded metal ions present in said solution, said stabiliser being present in an amount to stabilise the solution against thermal degradation which causes loss of solvent and discoloration of solvent and dissolved cellulose.

2. A polymer solution as claimed in claim 1 in which the stabiliser is present at a concentration up to about 3.0 percent, by weight, based on the weight of the solvent.

3. A polymer solution as claimed in claim 1 in which the stabiliser is present at a concentration of from about 0.1 to about 1.0 percent, by weight, based on the weight of the solvent.

4. A polymer solution as claimed in claim 1 in which said solvent comprises from about 1 to about 30 percent, by weight, of water based on the weight of said solvent.

5. A polymer solution as claimed in claim 1 in which said cyclic tertiary amine N-oxide is N-methyl morpholine N-oxide.

6. A polymer solution as claimed in claim 5 in which said solvent comprises from about 5 to about 20 percent, by weight, of water, based on the weight of said solvent.

7. A polymer solution as claimed in claim 1 in which the cellulose is present at a concentration of from about 5 to about 30 percent, by weight, based on the total weight of said solution.

8. A polymer solution as claimed in claim 1 in which dimethyl acetamide comprises a component of said solvent.

9. A process for making a shaped article which comprises shaping the solution of any one of claims 1 to 8, inclusive, and precipitating the cellulose from the shaped solution to form a shaped cellulose article.

* * * * *

UNITED STATES PATENT AND TRADEMARK OFFICE
CERTIFICATE OF CORRECTION

PATENT NO. : 4,581,072
DATED : April 8, 1986
INVENTOR(S) : Peter R. Laity

It is certified that error appears in the above-identified patent and that said Letters Patent are hereby corrected as shown below:

Column 1, line 33, after "ions", amend the remainder of line 33 and lines 34 and 35 to read as follows as a separate paragraph:

--The invention includes the stabilised solvent of the invention having an organic polymer dissolved therein. The preferred organic polymer is cellulose.--

Signed and Sealed this

Twenty-third Day of September 1986

[SEAL]

Attest:

DONALD J. QUIGG

Attesting Officer

Commissioner of Patents and Trademarks